Figure 5:
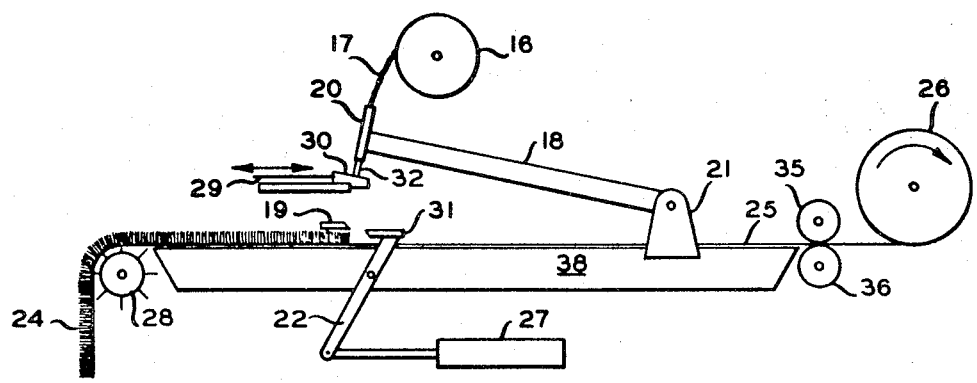

United States Patent [19]

Boultinghouse

[11] 3,839,124

[45] Oct. 1, 1974

[54] ARTICLE AND METHOD OF MANUFACTURE

[75] Inventor: Harold D. Boultinghouse, Bartlesville, Okla.

[73] Assignee: Phillips Petroleum Company, Bartlesville

[22] Filed: Sept. 1, 1972

[21] Appl. No.: 285,956

Related U.S. Application Data

[62] Division of Ser. No. 43,638, April 29, 1970, Pat. No. 3,709,771, which is a division of Ser. No. 598,682, Dec. 2, 1966, Pat. No. 3,580,761.

[52] U.S. Cl. .................................. 156/435, 56/436
[51] Int. Cl. .............................................. D04h 11/08
[58] Field of Search ...... 156/72, 306, 435; 156/436; 161/67; 226/97

[56] References Cited
UNITED STATES PATENTS

| | | | |
|---|---|---|---|
| 2,636,460 | 4/1953 | Seiderman | 161/67 |
| 2,639,250 | 5/1953 | Reinhardt | 156/72 |
| 3,145,446 | 8/1964 | Sussman | 156/72 |
| 3,266,969 | 8/1966 | Makansi | 156/435 |
| 3,398,949 | 8/1968 | Young | 226/97 |
| 3,679,114 | 7/1972 | Ostertag | 226/97 |

FOREIGN PATENTS OR APPLICATIONS 1,047,382   11/1966   Great Britain ........................ 156/72

*Primary Examiner*—Daniel J. Fritsch

[57] ABSTRACT

An apparatus is provided in the form of a hollow tubular needle through which one or more strands of material can be fed to compress the extremities thereof.

2 Claims, 5 Drawing Figures

PATENTED OCT 1 1974 3,839,124

ARTICLE AND METHOD OF MANUFACTURE

This is a divisional application of my copending application having Ser. No. 43,638, filed on Apr. 29, 1970, now U.S. Pat. No. 3,709,771 which is a divisional application of Ser. No. 598,682, filed Dec. 2, 1966, now U.S. Pat. No. 3,580,761.

This invention relates to nonwoven articles. In one aspect one or more strands of fusible material are compressed at one extremity and fused to a receptive base. In another aspect tufts of meltable material are physically bonded to a compatible, fusible base by compressing one or more strands of meltable material at one extremity and fusing that extremity to the compatible base. In another aspect one or more strands of heat fusible material are fed through a hollow tubular needle to compress the extremities thereof. In another aspect tufts of heat fusible material are physically bonded to a substrate having a roughened surface or open surface porosity by compressing one end thereof and fusing it to said substrate.

Natural and synthetic elastomeric materials have found application in the production of nonwoven composite sheets, webs, and decorative articles. I have now found a new method for producing such products from a variety of fusible materials.

It is therefore one object of this invention to produce nonwoven composite articles. It is another object of this invention to produce tuft composite sheet material. It is yet another object of this invention to provide a simplified method of fusing meltable material to desired backing. It is another object of this invention to provide apparatus for fusing meltable materials to receptive base stock.

In accordance with one embodiment of this invention, meltable material is fused to a receptive backing by compressing one or more strands of such material at one extremity and contacting a base material with the compressed melted extremity or extremities of the one or more strands and allowing the extremities to become attached to the base material. Once the extremity of the strand or strands has become physically attached to the base material, it can be cut into the desired length to produce either a pile fabric or decorative article as desired.

Essentially any fusible strand material can be employed within the concept of this invention. For example, natural or synthetic fusible elastomers or thermoplastics can be employed. Crystalline polymers of 1-olefins, particularly polypropylene and polyethylene are very acceptable in this application.

The base material can be essentially any composition structure or design to which the meltable strands can be fused. Although laminar webs or backings probably find greater application than do other structural configurations, although essentially any structure, e.g., three dimensional form, can be used. It is only necessary that the substrate or backing material be either capable of fusing with the strand composition or that its surface be porous or roughened so that a physical or structural bond can be formed between the fused strand extremities and the backing surface. Suitable backing materials are, for example, essentially any natural or synthetic woven or unwoven web stock, compatible, fusible materials of any structure, perforated or roughened materials, such as cardboard, wood, synthetic sheeting metals, etc., natural or synthetic organic or inorganic structures having surface porosity, such as foams, granular aggregates, etc.

The concept of this invention can be best understood by reference to the drawings, which are intended only to be illustrative of one embodiment of this invention.

Figure 4:
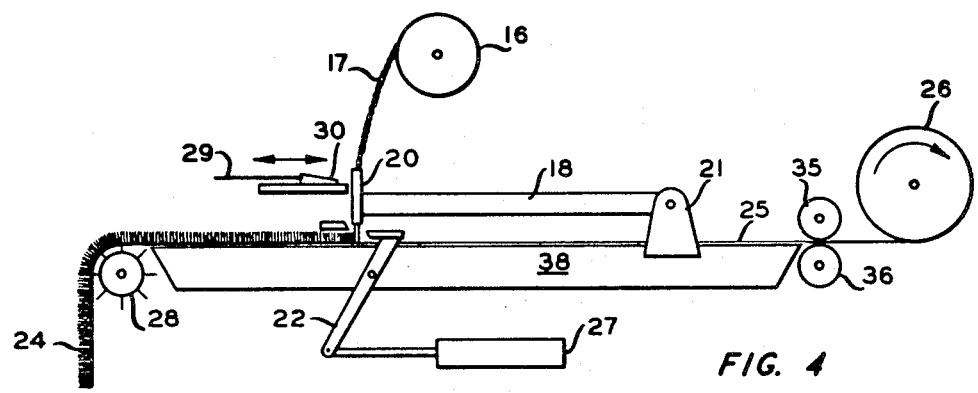
Figure 1:
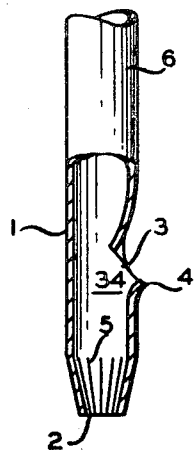
Figure 2:
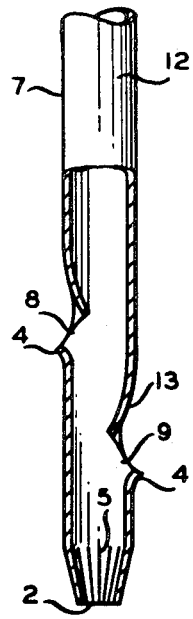
Figure 3:
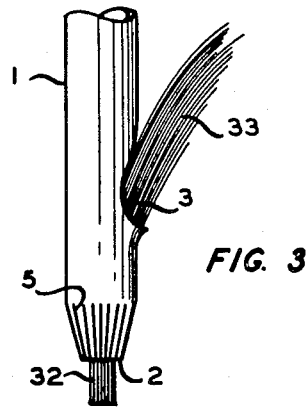

FIG. 1 illustrates a cross-sectional view of a presently preferred tuft-forming needle; FIG. 2 illustrates a cross-sectional view of a similar tuft-forming needle having the facility for accommodating a multiplicity of strands or strand composites; FIG. 3 illustrates the tubular needle of FIG. 1 in addition to the loose and compressed strand; FIG. 4 illustrates a combination apparatus for producing a pile fabric; and FIG. 5 illustrates another view of the apparatus of FIG. 4.

Referring now to FIG. 1, there is provided a hollow tubular needle 1, internal passage 34, restricted opening at one extremity 2, a second opening or inlet 3 and axial extension 6. The restricted opening 2 is preferably of a diameter substantially less than the internal diameter of internal passage 34 which is in turn preferably smaller than inlet passage 3. Inlet opening 3 can also be provided with suitable beveled guide means 4 for facilitating the entrance of one or more strands of material as hereinafter detailed.

It should be pointed out that throughout the disclosure and claims of this application that the strand material employed in this invention is intended to include all cross-sectional shapes of indefinite length material that can be manipulated in the manner described. Such materials are, for example, filaments, fibers, ribbons, fibrillated or unfibrillated oriented filaments, fibers, ribbons, or rods. All of these materials can be either foamed or unfoamed, although larger cross-sectional areas of foamed products can, of course, be employed. For example, either single or multiple foamed rods or heavy filaments can be passed through the needle of FIG. 1 with the only limitation being that they are capable of sufficient compression to allow their passage through the restricted passage or exit to illustrate it in FIG. 1. To compensate for the use of such heavy materials or heavy loading in normal applications, the lower extremity of hollow needle 1 can be made flexible through the provision of several longitudinal slits 5 to allow expansion of restricted passage 2 when necessary.

The hollow needle can also be provided with two or more openings 8 and 9, as illustrated in FIG. 2. This modification enables the use of two or more strands or combinations of strands of materials simultaneously to form tufts comprising combinations of dissimilar materials.

As illustrated in FIG. 3 the strands, ribbons, etc., or combinations thereof 33 enter inlet opening 3 in the hollow tubular needle 1 are compressed together in the restricted extremity of the needle and emanate from restricted opening 2 in the form of a compressed bundle 32.

In operation the compressed bundle 32 projecting slightly beyond restricted extremity 2 is melted and forced into intimate contact with the desired backing material by forcing needle 1 against the backing. The melted strands forming the compressed bundle are thus welded together and the additional melted material is caused to disperse intimately over the surface of the desired backing or throughout the porosity thereof depending, of course, on the structure of the backing material.

One form of apparatus suitable for producing tuft material within the concept of this invention is illustrated schematically in FIGS. 4 and 5. The desired backing material can be removed from roll 26 and passed through a suitable series of rolls 35, 36, and 28 to control the intermittent motion thereof. Sprigging arm 18 housing a multiplicity of hollow needles 20 is pivotably mounted by flange 21 on base 38. The desired strands of meltable material 17 are passed to needles 20 from storage 16. The compressed bundle 32 in FIG. 3 is melted and brought into intimate contact with backing 25 by forcing needles 20 against the backing through the action of sprigging arm 18. After the melted material has at least partially solidified to backing 25 in order to provide a sufficient bond therewith, the sprigging arm 18 is raised thereby pulling strands 17 through the needles 20. The sprigging arm is raised to a predetermined elevation at which time mobile cutting edge 31 actuated by lever 22 and suitable operating means, such as air cylinder 27, is forced against stationary cutting blade 19 to sever the bonded tufts in predetermined lengths and at the same time, leaving the desired length of compressed bundle 32 projecting slightly beyond the restricted extremities 2 of each needle. The sprigging arm 18 is then raised to the position illustrated in FIG. 5 and the projecting bundles 32 are contacted with heating element 30 to effect the melting thereof. Heating element 30 can be essentially any heating means capable of transferring sufficient heat to the projecting bundles to melt the same. For example, the heating element can be a resistive heater or simply a melt block which is heated by other means, such as an oven in its retracted position. The heating element, mounted on swinging arm 29, is then retracted and the cycle is repeated by again forcing needles 20 against backing material 25 through the action of sprigging arm 18.

During the above-described operations, backing material 25 is shifted, preferably intermittently, to remove the tuft material from the area of contact and to expose fresh backing.

Various color combinations and/or patterns can be produced by feeding strands of different color or composition to the several needles 20. Several sprigging arms 18 can be provided, each housing one or more of the needles 20 to provide the additional facility of intermittently spacing tufts either longitudinally or laterally, as desired, to produce patterns of varying configuration.

EXAMPLE

A fibrous yarn comprising a multiplicity of polypropylene fibers were passed through a single bore needle of stainless steel having an inside diameter of ¼ inch and a reduced diameter at the restricted extremity of 3/16 inch. ⅛ inch of the thus compressed bundle of filaments protruding from the restricted extremity was melted by using an open flame torch after which this material, in the melted state, was forced against and welded to a backing comprising melt spun polypropylene fiber coated with radial teleblock copolymer. After the melted material had solidified, the needle was withdrawn from the backing thereby pulling additional yarn through the needle which was cut to produce tufts 1¼ inches long and to leave about ⅛ inch of compressed fibers extending from the restricted extremity of the needle. This operation was repeated to position tufts of bonded material on ¼ inch center spacing to produce an extremely rugged carpet-like material. Similar articles were produced using ribbons and fiber strands of fibrillated and unfibrillated polypropylene and polyethylene bonded to perforated cardboard and partially fibrillated polypropylene films.

Numerous variations and modifications of the concept of this invention will be apparent to one skilled in the art in view of the foregoing disclosure, the drawings, and the appended claims to this invention, the essence of which is that one or more strands of meltable material are compressed together at one extremity, melted and forced into intimate contact with a receptive base or backing to form a source bond therebetween.

I claim:

1. An apparatus comprising at least one hollow, tubular member having an internal passage in communication with a restricted opening at one axial extremity of said tubular member, at least one inlet opening in said member removed from said extremity in communication with said internal passage, the cross-sectional area of said inlet opening being substantially greater than the cross-sectional area of said tubular passage and the internal cross-sectional area of said restricted passage being substantially smaller than the internal cross-sectional area of said internal passage, said tubular member being fixedly mounted on pivotably mounted supporting means, conveyor means for conveying laminar material, means for pivotably reciprocating said support means about said axis and contacting the restricted extremity of said tubular member with one surface of said laminar material, means for passing at least one strand of material into said inlet opening of said tubular member through said internal passage and through said restricted passage, cutting means for severing said strand passed through said tubular member slightly beyond said extremity thereof to retain a portion of said strand projecting beyond said extremity, and means for heating said projecting strand portion.

2. The apparatus of claim 1 wherein said tubular member has a plurality of said inlet openings for passing strands into said internal passage, there being at least one strand for each of said inlet openings.

* * * * *